(12) United States Patent
Matsumura et al.

(10) Patent No.: US 7,678,020 B2
(45) Date of Patent: Mar. 16, 2010

(54) VEHICLE CONTROL APPARATUS

(75) Inventors: Tetsuo Matsumura, Hitachinaka (JP); Yoshiyuki Yoshida, Hitachi (JP); Kinya Fujimoto, Hitachinaka (JP); Kentaro Shishido, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 326 days.

(21) Appl. No.: 11/654,005

(22) Filed: Jan. 17, 2007

(65) Prior Publication Data

US 2007/0202991 A1    Aug. 30, 2007

(30) Foreign Application Priority Data

Feb. 27, 2006   (JP)   .............................. 2006-049481

(51) Int. Cl.
*B60W 10/02* (2006.01)
(52) U.S. Cl. ...................................... 477/174
(58) Field of Classification Search ................ 477/167, 477/174, 70, 86, 94; 192/84.5
See application file for complete search history.

(56) References Cited

U.S. PATENT DOCUMENTS

| 4,172,505 A | 10/1979 | Rabus et al. |
| 4,650,056 A | 3/1987 | Sevennec et al. |
| 5,176,234 A | 1/1993 | Reik et al. |
| 6,446,522 B1 * | 9/2002 | Warren et al. .................. 74/335 |
| 6,607,060 B2 * | 8/2003 | Inoue ........................... 192/83 |
| 7,201,703 B2 * | 4/2007 | Ochi et al. .................... 477/174 |
| 7,204,785 B2 * | 4/2007 | Berger et al. ................... 477/94 |
| 2001/0008199 A1 | 7/2001 | Ahnert et al. |
| 2002/0086770 A1 * | 7/2002 | Fischer et al. ................. 477/93 |

FOREIGN PATENT DOCUMENTS

| FR | 2 645 805 A1 | 10/1990 |
| JP | 60-256671 A | 12/1985 |
| JP | 9-42443 A | 2/1997 |
| JP | 2004-068878 A | 3/2004 |

OTHER PUBLICATIONS

European Search Report dated Apr. 22, 2008 (Six (6) pages).

* cited by examiner

*Primary Examiner*—David D Le
*Assistant Examiner*—Justin Holmes
(74) *Attorney, Agent, or Firm*—Crowell & Moring LLP

(57) ABSTRACT

A vehicle clutch has a pushing member that is energized against a friction plane and transfers power from a driving power source when it touches the friction plane. The location of the pushing member can be retained even when power is shut off. After a signal from the key switch ends, the control apparatus stops the driving power source and the vehicle, engages the friction transfer mechanism, and then stops the system.

3 Claims, 10 Drawing Sheets

VEHICLE CONTROL APPARATUS

CLAIM OF PRIORITY

The present application claims priority from Japanese application serial no. 2006-49481, filed on Feb. 27, 2006, the content of which is hereby incorporated by reference into this application.

FIELD OF THE INVENTION

This invention relates to a vehicle control apparatus and more particularly to controlling of a friction transfer mechanism.

BACKGROUND OF THE INVENTION

Recently, an automatic clutch system has been developed which uses a gear type transmission for manual transmission and automates operation of a clutch which is a friction mechanism. Further, an automated manual transmission (hereinafter abbreviated as "automated MT") has also been developed which automates operations of a clutch and a synchromesh mechanism.

The automatic clutch and the automated MT respectively launch a vehicle by gradually engaging a clutch that connects and disconnects torque of an engine which is a driving power source. Further, when a transmission starts, the automated MT disengages the clutch that connects and disconnects torque of an engine which is a driving power source, switches the synchromesh mechanism, and then engages the clutch again. In general, a dry single disc clutch is used for the clutch that connects and disconnects torque of an engine which is a driving power source. The dry single disc clutch is equipped with a diaphragm spring that generates a force to push the clutch toward the disc and keep the engagement of the clutch.

Conventionally, when the key switch is turned off while the synchromesh mechanism is engaged, power supply to the clutch actuator is shut off and the clutch is engaged. As the result, the vehicle runs off. To avoid this, an automatic neutral technology has been known which neutralizes the synchromesh mechanism and engages the clutch. (For example, see Japanese Patent 3501881)

Further, an actuator structure using an electric motor and a worm gear has been well known. (For example, see Japanese Patent Laid-open No. Sho 60 (1985)-256671, Japanese Patent Laid-open No. 2004-68878) The worm gear has a self-locking property and can keep the clutch disengaged after power supply to the electric motor is shut off. Therefore, the actuator of a self-locking property can prevent the clutch from being engaged by shut-off of power supply to the actuator when the key switch is turned off.

SUMMARY OF THE INVENTION

However, the diaphragm spring provided on the clutch (as described above) may be easily deteriorated if the key switch is turned off and the clutch is disengaged for a long time.

An object of this invention is to provide a clutch controller to avoid promotion of deterioration of the diaphragm spring in a state in which the key switch is turned off and the disengagement of the clutch is retained.

This invention relates to a vehicle control apparatus comprising a friction transfer mechanism that transfers power from a driving power source by pushing a pushing member against a friction plane by an energizing mechanism, and an electrically-operated mechanism that disengages and engages the friction transfer mechanism by controlling the position of the pushing member and can keep the pushing member at the current position even when electric power is shut off; wherein after receiving a System Stop command signal, the vehicle control apparatus, detects that the driving power source and the vehicle have stopped, engages the friction transfer mechanism, and stops the system, namely shuts off power supply to the electrically-operated mechanism.

A vehicle control apparatus in accordance with this invention can shut off power supply after detecting the vehicle status and engaging the clutch. Therefore, after the key switch is turned off, the vehicle control apparatus does not leave the clutch engaged and can avoid promotion of deterioration of the diaphragm spring.

DESCRIPTION OF THE PREFERRED EMBODIMENTS

Embodiments of this invention will be explained in detail below with reference to FIG. 1 to FIG. 10.

Embodiment 1

First will be explained an example of configuration of a vehicle control apparatus that is equipped with the friction transfer mechanism and an electrically-operated mechanism in accordance with this invention by referring to FIG. 1.

Figure 1:
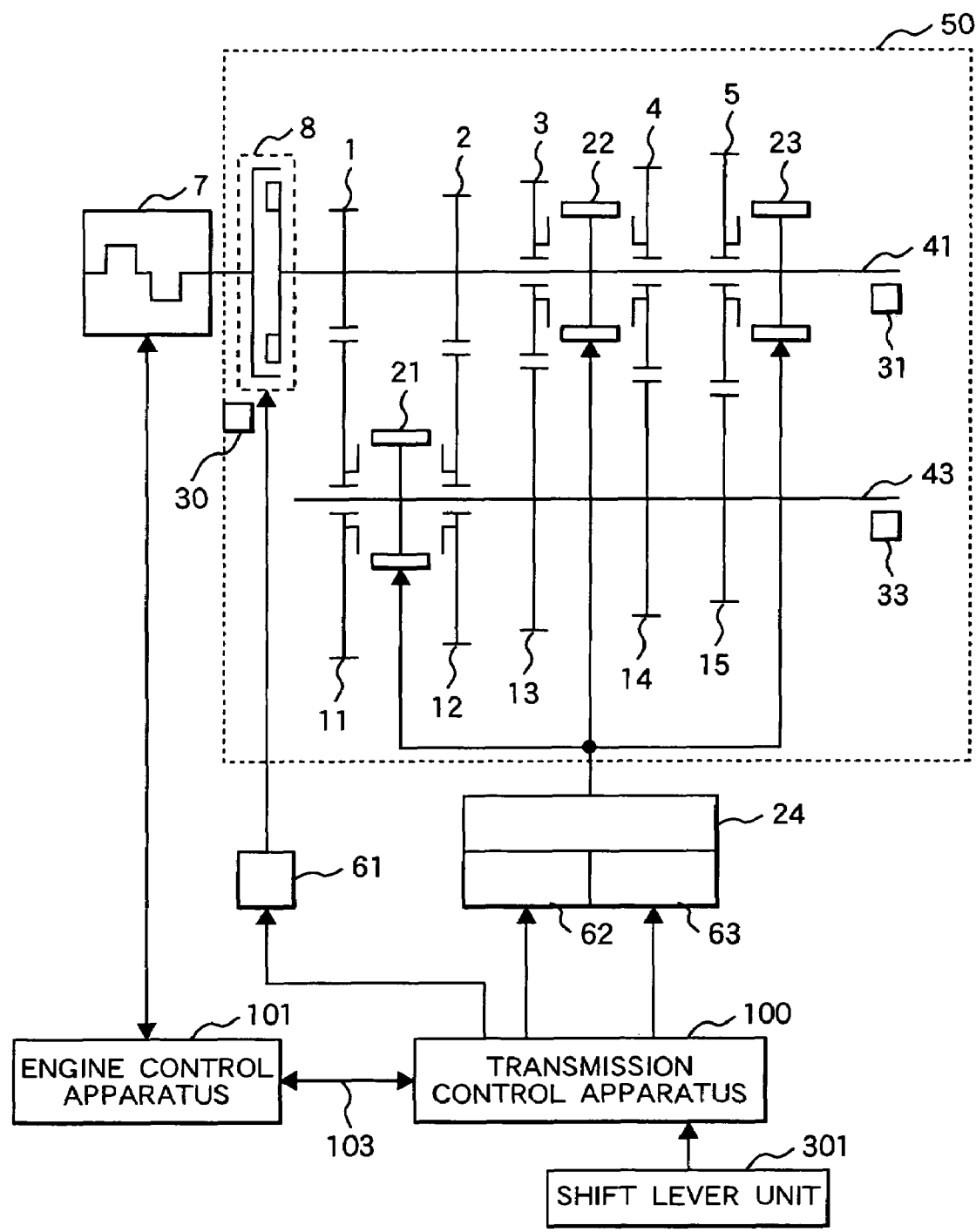
FIG. 1 shows a skeletal diagram of a vehicle system configuration equipped with a control apparatus which is an embodiment of this invention.

FIG. 1 shows a skeletal diagram of a vehicle system configuration equipped with a control apparatus which is an embodiment of this invention.

The vehicle system is equipped with engine 7 which is a driving power source, an engine speed sensor (not shown in the figure) which measures the number of revolutions of engine 7, an electronic controlled throttle valve (not shown in the figure) and a fuel injection unit (not shown in the figure) to inject an adequate quantity of fuel which matches with the air suction rate. Engine control apparatus 101 exactly controls torque of engine 7 by adjusting suction air rate, fuel injection rate, ignition timing, etc. There are two kinds of fuel injection units: intake port injection method which injects fuel to the intake port and cylinder fuel injection method which injects fuel directly into a cylinder. It is advantageous to select a method for an engine which can consume less fuel and have better exhaust performance considering a running field required by the engine (determined by engine torque and engine speed). Any driving power source can be used such as gasoline engine, diesel engine, natural gas engine, and electric motor.

Automatic transmission 50 is equipped with input shaft clutch 8, transmission input shaft 41, transmission output shaft 43, 1st drive gear 1, 2nd drive gear 2, 3rd drive gear 3, 4th drive gear 4, 5th drive gear 5, 1st driven gear 11, 2nd driven gear 12, 3rd driven gear 13, 4th driven gear 14, 5th driven gear 15, 1st mesh type mechanism 21, 2nd mesh type mechanism 22, 3rd mesh type mechanism 23, rotary sensor 30, rotary sensor 31, and rotary sensor 33. It is possible to connect torque of engine 7 to transmission input shaft 41 and disconnect the torque from input shaft 41 by engaging and disengaging input shaft clutch which is a friction transfer mechanism. An electrically-operated mechanism (electric actuator) 61 which is electrically operated is used to control the pushing force (input shaft clutch torque) of input shaft clutch 8. The transmission torque of input shaft clutch 8 is controlled by regulating the current of a motor (not shown in the figure) which is provided for the input clutch actuator 61. Rotary sensor 30 to detect the number of revolutions of engine 7 (engine speed) is provided on the rotary part of input shaft clutch 8 in the engine side.

Input shaft 41 is equipped with 1st drive gear 1, 2nd drive gear 2, 3rd drive gear 3, 4th drive gear 4, and 5th drive gear 5. 1st drive gear 1 and 2nd drive gear 2 are fixed to transmission input shaft 41. 3rd drive gear 3, 4th drive gear 4, and 5th drive gear 5 are mounted on transmission input shaft 41 so that they can revolve. Rotary sensor 31 is provided as a means to detect the number of revolutions of the transmission input shaft 41.

Output shaft 43 is equipped with 1st driven gear 11, 2nd driven gear 12, 3rd driven gear 13, 4th driven gear 14, and 5th driven gear 15. 1st driven gear 11 and 2nd driven gear 12 are mounted on transmission output shaft 43 so that they can revolve. 3rd driven gear 13, 4th driven gear 14, and 5th driven gear 15 are fixed to transmission output shaft 43. Rotary sensor 33 is provided as a means to detect the number of revolutions of the transmission output shaft 43.

Among these gears, 1st drive gear 1 is engaged with 1st driven gear 11. 2nd drive gear 2 is engaged with 2nd driven gear 12. 3rd drive gear 3 is engaged with 3rd driven gear 13. 4th drive gear 4 is engaged with 4th driven gear 14. 5th drive gear 5 is engaged with 5th driven gear 15.

1st mesh type mechanism 21 is provided between 1st driven gear 11 and 2nd driven gear 12. 1st mesh type mechanism 21 works to couple 1st driven gear 11 with output shaft 43 and 2nd driven gear 12 with output shaft 43. Therefore, the rotational torque applied to input shaft 41 is transmitted to output shaft 43 in the order of 1st drive gear 1, 1st driven gear 11, and output shaft 43 through 1st mesh type mechanism 21 or in the order of 2nd drive gear 2, 2nd driven gear 12, and output shaft 43.

2nd mesh type mechanism 22 is provided between 3rd drive gear 3 and 4th drive gear 4. 2nd mesh type mechanism 22 works to couple 3rd drive gear 3 with input shaft 41 and 4th drive gear 4 with input shaft 41. Therefore, the rotational torque applied to input shaft 41 is transmitted to output shaft 43 in the order of 3rd drive gear 3, 3rd driven gear 13, and output shaft 43 through 2nd mesh type mechanism 22 or in the order of 4th drive gear 4, 4th driven gear 14, and output shaft 43.

3rd mesh type mechanism 23 is provided at the side of 5th drive gear 5 and works to couple 5th drive gear 5 with input shaft 41. Therefore, the rotational torque applied to input shaft 41 is transmitted to output shaft 43 in the order of 5th drive gear 5, 5th driven gear 15, and output shaft 43 through 3rd mesh type mechanism 23.

Here, mesh type mechanisms 21, 22, and 23 can be of the constant mesh type or synchromesh type which is equipped with a friction transfer mechanism that pushes its friction surface and engages by synchronizing rotational speeds.

To transmit the rotational torque of transmission input shaft 41 to transmission output shaft 43, it is necessary to move one of 1st, 2nd, and 3rd mesh type mechanisms (21, 22, and 23) along the transmission input shaft 41 or transmission output shaft 43 and couple it with one of 1st driven gear 11, 2nd driven gear 12, 3rd drive gear 3, 4th drive gear 4, and 5th drive gear 5. The select actuator 63 causes shift/select mechanism 24 to select one of mesh type mechanisms (21, 22, and 23) to move. Shift actuator 62 causes shift/select mechanism 24 to move the selected mesh type mechanism (21, 22, or 23) and couple it with one of 1st driven gear 11, 2nd driven gear 12, 3rd drive gear 3, 4th drive gear 4, and 5th drive gear 5. With this, the rotational torque of transmission input shaft 41 can be transmitted to transmission output shaft 43 through one of the mesh type mechanisms (21, 22, and 23).

In this way, the rotational torque of transmission input shaft 41 transmitted to transmission output shaft 43 through the drive gears (1st drive gear 1, 2nd drive gear 2, 3rd drive gear 3, 4th drive gear 4, and 5th drive gear 5) and the driven gears (1st driven gear 11, 2nd driven gear 12, 3rd driven gear 13, 4th driven gear 14, and 5th driven gear 15) and further transmitted to the axle (not shown in the drawing) through a differential gear (not shown in the drawing) which is coupled with transmission output shaft 43.

Input shaft clutch actuator 61 which is a working mechanism to control the transmission torque of input shaft clutch 8 controls the transmission torque of input shaft clutch 8 by controlling the current of a motor (not shown in the drawing) which is provided on input shaft clutch actuator 61. Input shaft clutch actuator 61 is further equipped with a position sensor (not shown in the drawing) to measure the stroke of the input shaft clutch.

Transmission control apparatus 100 controls the stroke position (select position) of a control arm (not shown in the drawing) which is provided on shift/select mechanism 24 by controlling the current of a motor (not shown in the drawing) which is provided on select actuator 63 and selects a mesh type mechanism (1st mesh type mechanism 21, 2nd mesh type mechanism 22, or 3rd mesh type mechanism 23) to select. Select actuator 63 is provided with a positional sensor (not shown in the drawing) to measure a select position.

Transmission control apparatus 100 controls the rotational force and position of a control arm (not shown in the drawing) which is provided on shift/select mechanism 24 by controlling the current of a motor (not shown in the drawing) which is provided on shift actuator 62 and controls the load or stroke position (shift position) which operates one of the mesh type mechanism (21, 22, or 23) which is selected by select actuator 63. Shift actuator 62 is provided with a positional sensor (not shown in the drawing) to measure a shift position.

Transmission 50 is equipped with an oil temperature sensor (not shown in the drawing) to measure the temperature of lubricant in transmission 50.

Input shaft clutch 8 is equipped with a temperature (not shown in the drawing) to measure the temperature of the frictional surface of input shaft clutch 8.

The first-speed position is selected by controlling select actuator 63 to control the select position, selecting movement of first mesh type transmission mechanism 21, controlling shift actuator 62 to control the shift position, and engaging first mesh type transmission mechanism 21 with first driven gear 11.

The second-speed position is selected by controlling select actuator 63 to control the select position, selecting movement of first mesh type transmission mechanism 21, controlling shift actuator 62 to control the shift position, and engaging first mesh type transmission mechanism 21 with second driven gear 12.

The third-speed position is selected by controlling select actuator 63 to control the select position, selecting movement of second mesh type transmission mechanism 22, controlling shift actuator 62 to control the shift position, and engaging second mesh type transmission mechanism 22 with third drive gear 3.

The fourth-speed position is selected by controlling select actuator 63 to control the select position, selecting movement of second mesh type transmission mechanism 22, controlling shift actuator 62 to control the shift position, and engaging second mesh type transmission mechanism 22 with fourth drive gear 4.

The fifth-speed position is selected by controlling select actuator 63 to control the select position, selecting movement of third mesh type transmission mechanism 23, controlling shift actuator 62 to control the shift position, and engaging second mesh type transmission mechanism 23 with fifth drive gear 5.

Shift/select mechanism 24 for operating the mesh type mechanisms (21, 22, and 23) can be constructed with a control shaft, a control arm, a shift fork, and other parts or a drum or other mechanism to move the mesh type mechanisms (21, 22, and 23).

Shift lever unit 301 sends range position signals which indicate shift lever positions such as P, R, N, and D ranges to transmission control apparatus 100.

Transmission control apparatus 100 transfers information to and from engine control apparatus 101 by communication means 103.

Figure 2:
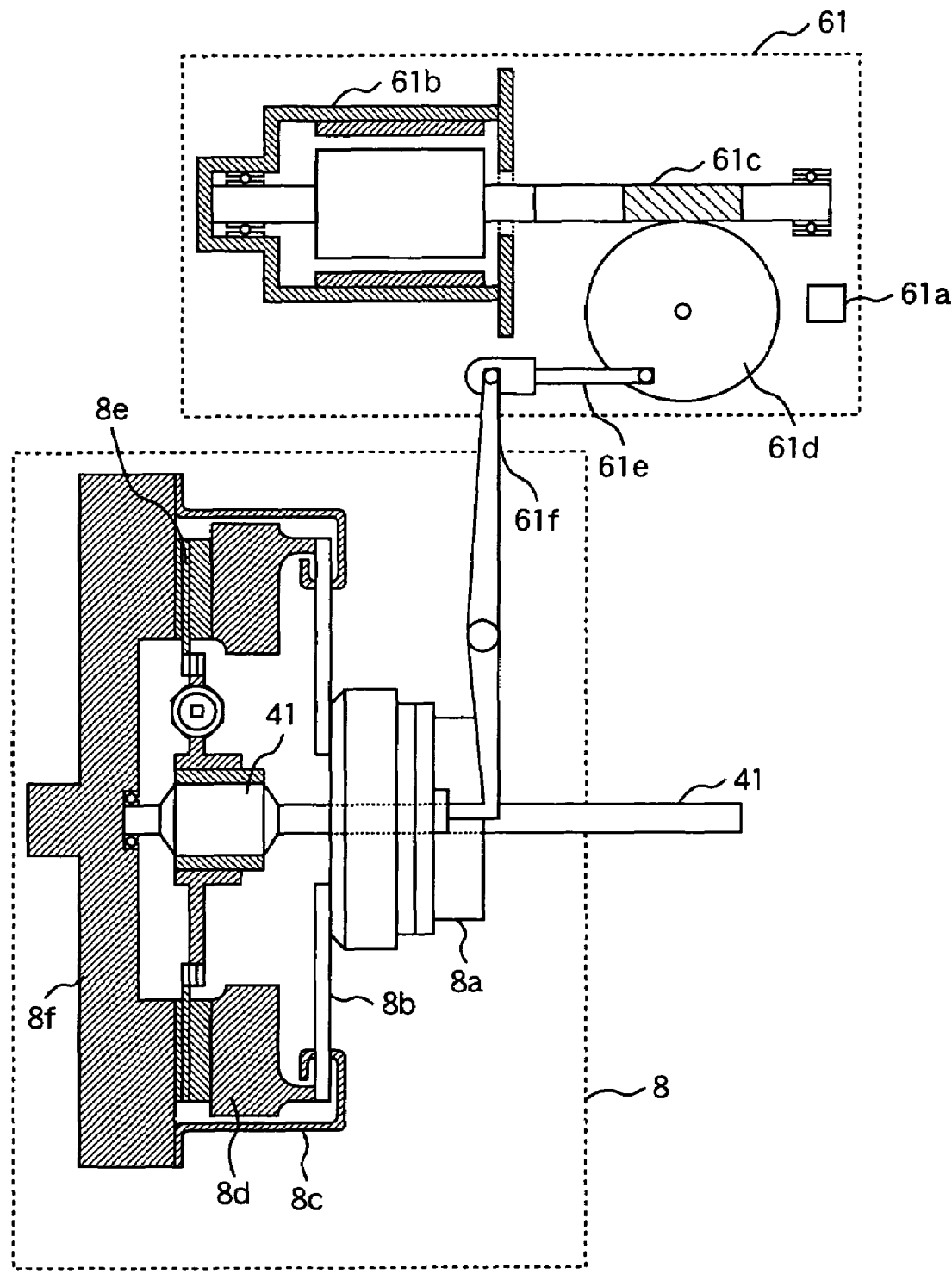
FIG. 2 shows a constitutional example of input shaft clutch 8 which is a friction transfer mechanism of FIG. 1 and input shaft actuator 61 which is an electrically operated mechanism.

FIG. 2 shows a constitutional example of input shaft clutch which is a friction transfer mechanism of FIG. 1 and input shaft actuator 61 which is an electrically operated mechanism. FIG. 2 shows magnified sectional views of selected parts of input shaft actuator 61 and transmission input shaft 41.

Referring to FIG. 2, flywheel 8f is coupled with engine 7 of FIG. 1 and receives rotational torque from engine 7. Flywheel 8f, clutch cover 8c, diaphragm spring 8b which is an energizing mechanism, and pressure plate 8d are connected together to revolve in a body. A bearing is provided between flywheel 8f and transmission input shaft 41 so that flywheel 8f and transmission input shaft 41 can revolve each other. Further, a bearing is provided between the transmission input shaft 41 and the combination of the release bearing 8a and the diaphragm spring 8b so that they can revolve freely. Diaphragm spring 8b which is an energizing mechanism always applies a load to push pressure plate 8d towards flywheel 8f. This configuration is called Normal Close configuration.

Input shaft clutch actuator 61 of FIG. 2 is equipped with clutch motor 61b. The rotational torque generated by clutch motor 61b rotates worm gear 61c. Worm gear 61c causes worm wheel 61d to rotate and push rod 61e to make strokes.

The stroke movement of the push rod causes release fork 61f to operate. Release fork 61f causes release bearing 8a to make strokes. The stroke movement of release bearing 8a causes diaphragm spring 8b to be displaced. This displacement causes pressure place 8d to make strokes. As the result, pressure place 8d is pressed against clutch disk 8e and the rotational torque of engine 7 (flywheel 8f) is transmitted to transmission input shaft 41 by means of clutch disk 8e. When worm gear 61c and worm wheel 61d are used here, the rotational torque of clutch motor 61b can cause release bearing 8a to make strokes. However, when current is not supplied to clutch motor 61b, the reactive force of diaphragm spring 8b cannot rotate clutch motor 61b. This accomplishes a so-called self-locking retaining mechanism. The self-locking property also contains a case in which clutch motor 61b is rotated a little by the reactive force of diaphragm spring 8b. Therefore, the worm gear can be substituted by a hypoid gear or other gear form.

Input shaft clutch actuator 61 is equipped with positional sensor 61a which measures strokes of the input shaft clutch. Positional sensor 61a in FIG. 2 is a rotational angle sensor that detects a rotational angle of worm wheel 61d. This sensor detects the stroke of pressure plate 8d. It is possible to provide a stroke sensor on push rod 61e to measure strokes of the input shaft clutch or a rotational angle sensor on release fork 61f with a link mechanism therebetween. Various sensors are available as long as they can detect strokes of pressure plate 8d.

This embodiment is designed so that release fork 61f may cause release bearing 8a to stroke. However, it is possible to use a so-called direct release type which assembles a driven oil-pressure cylinder and a piston in release bearing 8a and disposes a main driving oil-pressure cylinder and a piston outside input shaft clutch 8. (It is possible to dispose the main driving oil-pressure cylinder and the piston inside input shaft clutch actuator 61.)

Further, although this embodiment is designed to control input shaft clutch actuator 61 by clutch motor 61b, the motor can be substituted by an electromagnetic coil or valve.

Figure 3:
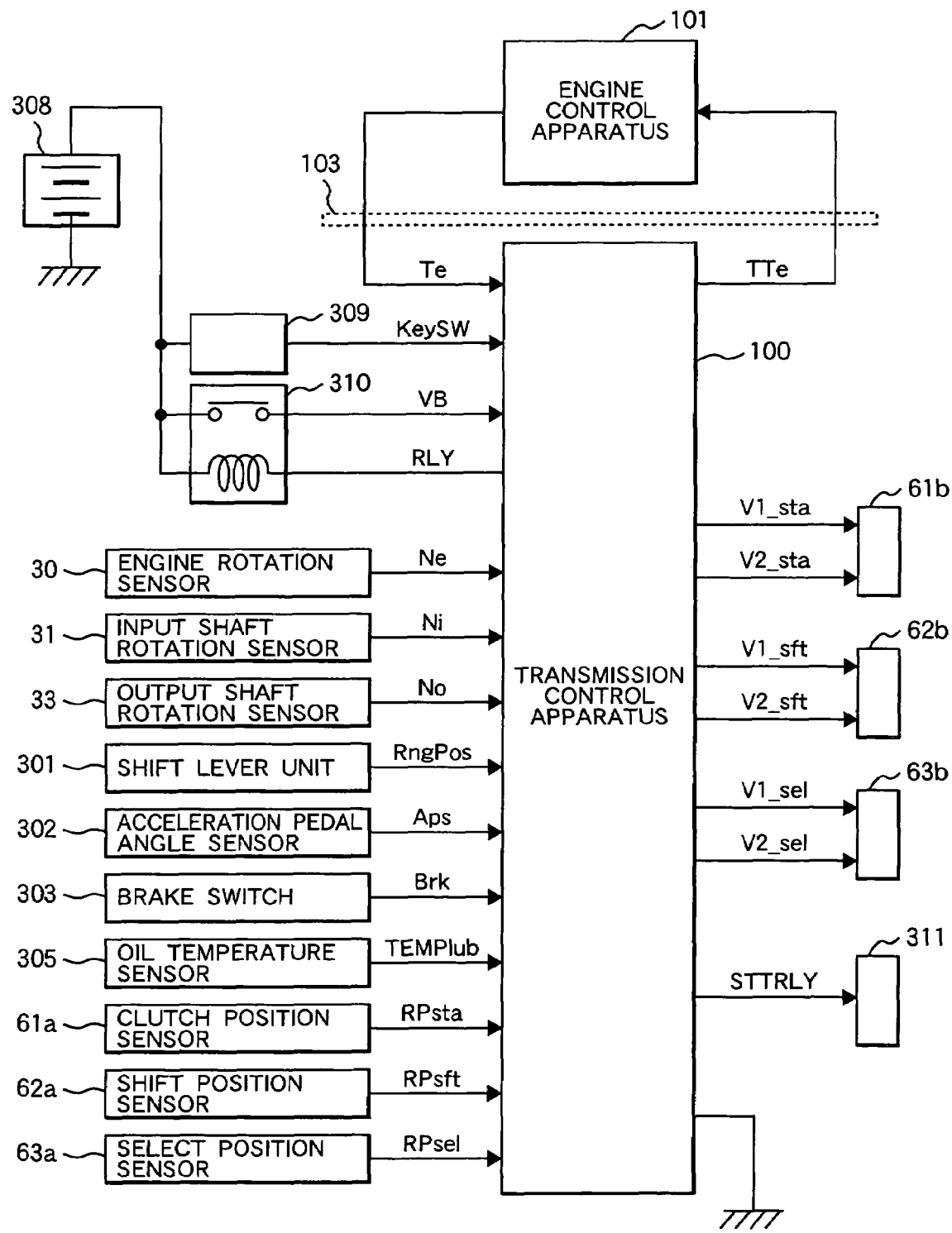
FIG. 3 shows connections of I/O signals of transmission control apparatus 100 and engine control apparatus 101 in the example of FIG. 1.

FIG. 3 shows connections of I/O signals of transmission control apparatus 100 and engine control apparatus 101 in the example of FIG. 1.

Transmission control apparatus 100 is designed as a control apparatus which is equipped with an input signal processing circuit (not shown in the drawing), an output signal processing circuit (not shown in the drawing), and a communication circuit (not shown in the drawing). Similarly, engine control apparatus 101 is designed as a control apparatus which is equipped with an input signal processing circuit (not shown in the drawing), an output signal processing circuit (not shown in the drawing), a communication circuit (not shown in the drawing) and a computer (not shown in the drawing). Engine torque command value TTe is sent from transmission control apparatus 100 to engine control apparatus 101 through communication means 103. In response to TTe, engine control apparatus 101 controls intake air rate, fuel injection rate, ignition timing and so on (not shown in the drawing) of engine 7. Engine control apparatus 101 houses a detector means (not shown in the drawing) to detect engine torque which is input to the transmission. The detector means detects engine torque Te generated by engine 7 under control of engine control apparatus 101 and sends a detection signal to transmission control apparatus 100 through communication means 103. The engine torque detecting means can be a torque sensor or a means that can estimate engine torque by engine parameters such as fuel injection pulses (of the injector), intake tube pressure, and engine speed.

Key switch box 309 which is a system start/stop mechanism to generate system start and stop signals and relay box 310 which is a shut-off mechanism are respectively connected to battery 308. Key switch box 309 sends key switch signal KeySW to transmission control apparatus 100. Relay box 310 supplies battery voltage VB to transmission control apparatus 100.

Transmission control apparatus 100 turns on and off supply of battery voltage (VB) to transmission control apparatus 100 by turning on and off relay output signal RLY which is sent to relay box 310 (as a power shut-off mechanism).

Transmission control apparatus 100 turns on relay output signal RLY which is sent to relay box 310 (to supply power) when key switch signal KeySW is ON. However, relay output signal RLY which is sent to relay box 310 can remain ON even when key switch signal KeySW is OFF and can be turned off at any timing. Relay output signal RLY should preferably be turned on by ORing a signal from a computer (not shown in the drawing) which is provided in transmission control apparatus 100 and key switch signal KeySW. Generally, ignition signals are used as key switch signal KeySW. The other signals such as accessory signals can be used key switch signal KeySW.

Transmission control apparatus 100 receives number of revolutions Ne of the engine, number of revolutions Ni of the input shaft, and number of revolutions No of the output shaft respectively from rotary sensors 30, 31, and 32, range position signal RngPos which indicates a shift lever position (P, R, N, or D range) from shift lever unit 301, accelerator pedal position Aps from Acceleration Pedal Angle sensor 302, and Brake ON/OFF signal Brk from brake switch 303 which detects whether the brake pedal is operated.

Transmission control apparatus 100 receives lubricant temperature signal TEMPlub from Oil Temperature sensor 305 which measures the temperature of lubricant in transmission 50.

Transmission control apparatus 100 also receives clutch position signal RPsta which indicates the stroke of the input shaft clutch.

Transmission control apparatus 100 also receives shift position signal RPsft which indicates the stroke position of the first, second, or third mesh type mechanism (21, 22, or 23).

Transmission control apparatus 100 also receives select position signal RPsel which indicates the stroke position of the control arm to select the first, second, or third mesh type mechanism (21, 22, or 23).

Transmission control apparatus 100 determines engine torque command value TTe and input shaft clutch target transmission torque TTs to accomplish the intention of the driver, judging that the driver wants to launch and accelerate the vehicle when the driver select for example a D shift range or that the driver wants to decelerate and stop the vehicle when the driver stamps on the brake pedal.

Transmission control apparatus 100 selects a target shifting position from vehicle speed Vsp which is calculated from the number of revolutions of the output shaft (No) and accelerator pedal position Aps and determines TTe (engine torque command value), TTs (input shaft clutch target transmission torque), TPsft (target shift position), TFsft (target shift load) and TPsel (target select position) to accomplish shifting to the selected shifting position.

To accomplish input shaft clutch target transmission torque TTs, transmission control apparatus 100 controls voltages V1_sta and V2_sta which are applied to clutch motor 61b of input shaft clutch actuator 61 and current which passes through clutch motor 61b, and thus engage and disengage input shaft clutch 8.

To accomplish target select position TPsel, transmission control apparatus 100 controls voltages V1_sel and V2_sel which are applied to select motor 63b of select actuator 63, and current which passes through select motor 63b, and thus selects the first, second, or third mesh type mechanism (21, 22, or 23) to engage.

To accomplish target shift position TPsft or target shift load TFsft, transmission control apparatus 100 controls voltages V1_sft and V2_sft which are applied to shift motor 62b of shift actuator 62, and current which passes through shift motor 62b, and thus engages and disengages the first, second, or third mesh type mechanism (21, 22, or 23).

Transmission control apparatus 100 is equipped with a current detecting circuit (not shown in the drawing), changes a voltage output so that respective motor currents may satisfy the target current value, and thus control the rotational torque of each motor.

To start the engine under a preset condition, transmission control apparatus 100 turns on (to supply power) and off (to shut off power) signal STTRLY output to starter relay 311. The starter (not shown in the drawing) to start the engine is cranked only when signal STTRLY is ON (to supply power).

A motor for respective actuators is a direct current motor which has stationary magnets and rotating windings. However, the motor can be a so-called permanent magnet synchronous motor which has stationary windings and moving magnets or any other motor.

In this embodiment, input shaft clutch actuator 61, shaft actuator 62, and select actuator 63 are motor-driven actuators each of which is equipped with a motor. However, shaft actuator 62 and select actuator 63 can respectively be a hydraulic actuator which is equipped with a hydraulic solenoid valve, a hydraulic piston, and a hydraulic cylinder.

This embodiment is designed to cause rotary sensor 30 to detect the number of revolutions of the engine (Ne). However, the number of revolutions of the engine (Ne) can be received from engine control apparatus 101 through a communication means.

Further, this embodiment is designed to cause rotary sensor 33 to detect the number of revolutions of the output shaft (No). However, the number of revolutions of the output shaft (No) can be received through a communication means. Further the number of revolutions of the output shaft (No) can be substituted by the number of revolutions of the drive shaft or the number of revolutions of the wheel (or vehicle speed).

Next will be explained a detailed controlling of the vehicle control apparatus of this invention referring to FIG. 4 to FIG. 6.

Figure 4:
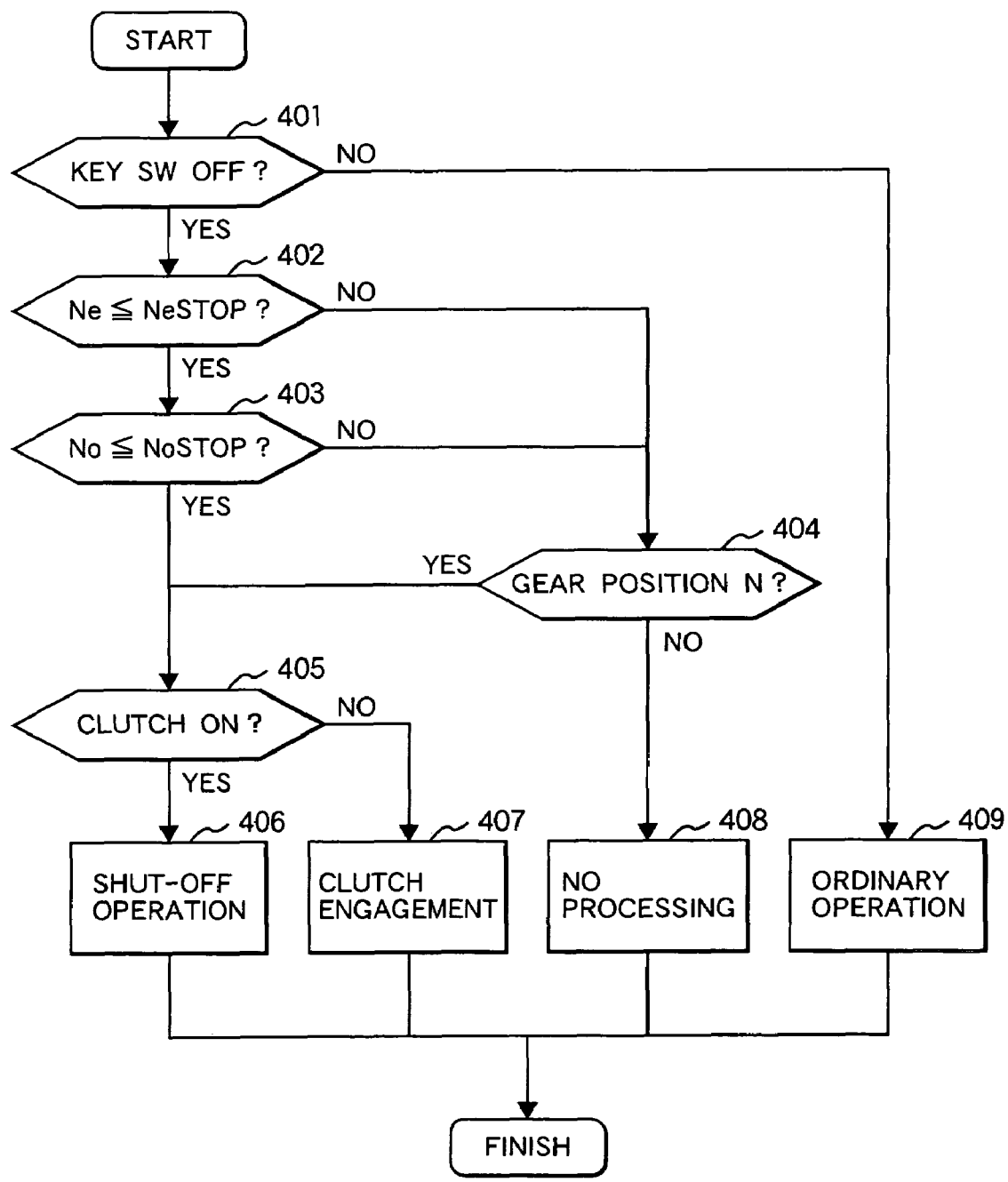
FIG. 4 shows a control flow of the vehicle control apparatus which is the example of FIG. 1.

FIG. 4 shows a control flow of the vehicle control apparatus which is the example of FIG. 1.

The content of FIG. 4 is programmed into the computer in transmission control apparatus 100 and repetitively executed at preset intervals. In other words, Step 401 to Step 409 below are executed by transmission control apparatus 100.

At Step 401, the control apparatus checks whether key switch signal KeySW is ON (to start) or OFF (to stop). When key switch signal KeySW is ON (to start), control is transferred to Step 409 (for ordinary operation). At Step 409, the control apparatus controls input shaft clutch actuator 61, shaft actuator 62, and select actuator 63 according to a requested operation (launching or gear-shifting) by using range position signal RngPos, acceleration pedal angle Aps, number of revolutions of engine Ne, number of revolutions of input shaft Ni, number of revolutions of output shaft No, and brake pressure Pbrk or Brake ON/OFF signal. When key switch signal KeySW is OFF (to stop), control is transferred to Step 402.

At Step 402, the control apparatus checks whether the engine is at rest or whether the number of revolutions of the engine (Ne) is equal to or less than a preset threshold value (NeStop). Control is transferred to Step 404 when Ne is greater than NeStop or to Step 403 when Ne is equal to or smaller than NeStop.

Here, NeStop (threshold value) should be equal to or smaller than the number of revolutions of the engine at full-combustion or as small as possible according to the accuracy of the detecting means so that the full engine stop may be judged. It is preferable to provide a delay time before the judgment at Step 402.

At Step 403, the control apparatus checks whether the vehicle is at rest or whether the number of revolutions of the output shaft (No) is equal to or less than a preset threshold value (NoStop). Control is transferred to Step 404 when No is greater than NoStop or to Step 405 when No is equal to or smaller than NoStop.

At Step 403, the control apparatus uses the number of revolutions of the output shaft (No) to check whether the vehicle is at rest. However, it is possible to use the number of revolutions of the drive shaft, the number of revolutions of wheels (vehicle speed), or a number-of-revolutions signal (vehicle speed signal) through a communication means.

Here, NoStop (threshold value) should be as small as possible according to the accuracy of the detecting means so that the full engine stop may be judged. It is preferable to provide a delay time before the judgment at Step 403.

At Step 404, the control apparatus checks whether the shift gear position is neutral. Control is transferred to Step 408 (No processing) when the shift gear position is not neutral or to Step 405 when the shift gear position is neutral.

At Step 405, the control apparatus checks whether the clutch is engaged, or whether clutch position RPsta is engaged. When clutch position RPsta is engaged, control is transferred to Step 406. At Step 406, the control apparatus turns off relay output signal RLY to shut off power to transmission control apparatus 100. When clutch position RPsta is not engaged, control is transferred to Step 407. At Step 407, the control apparatus causes input shaft clutch actuator 61 to engage input shaft clutch 8.

Here, the clutch position should preferably be corrected through studying since clutches are not free from machine-to-machine difference and clutch positions are greatly affected by their abrasion.

Here, processing of FIG. 4 can comprise the steps of detecting that key switch signal KeySW is OFF (to stop), measuring a time period during which key switch signal KeySW is OFF at Step 401, going to Step 408 (No processing) when the measured time is shorter than a preset time period, going to Step 405 when the measured time is equal to or longer than a preset time period, going to Step 407 when the clutch position RPsta is not engaged, causing input shaft clutch actuator 61 to engage input shaft clutch 8, going to Step 406 when the clutch position RPsta is engaged, turning off relay output signal RLY, and thus shutting off power to transmission control apparatus 100 with a time delay.

Figure 5:
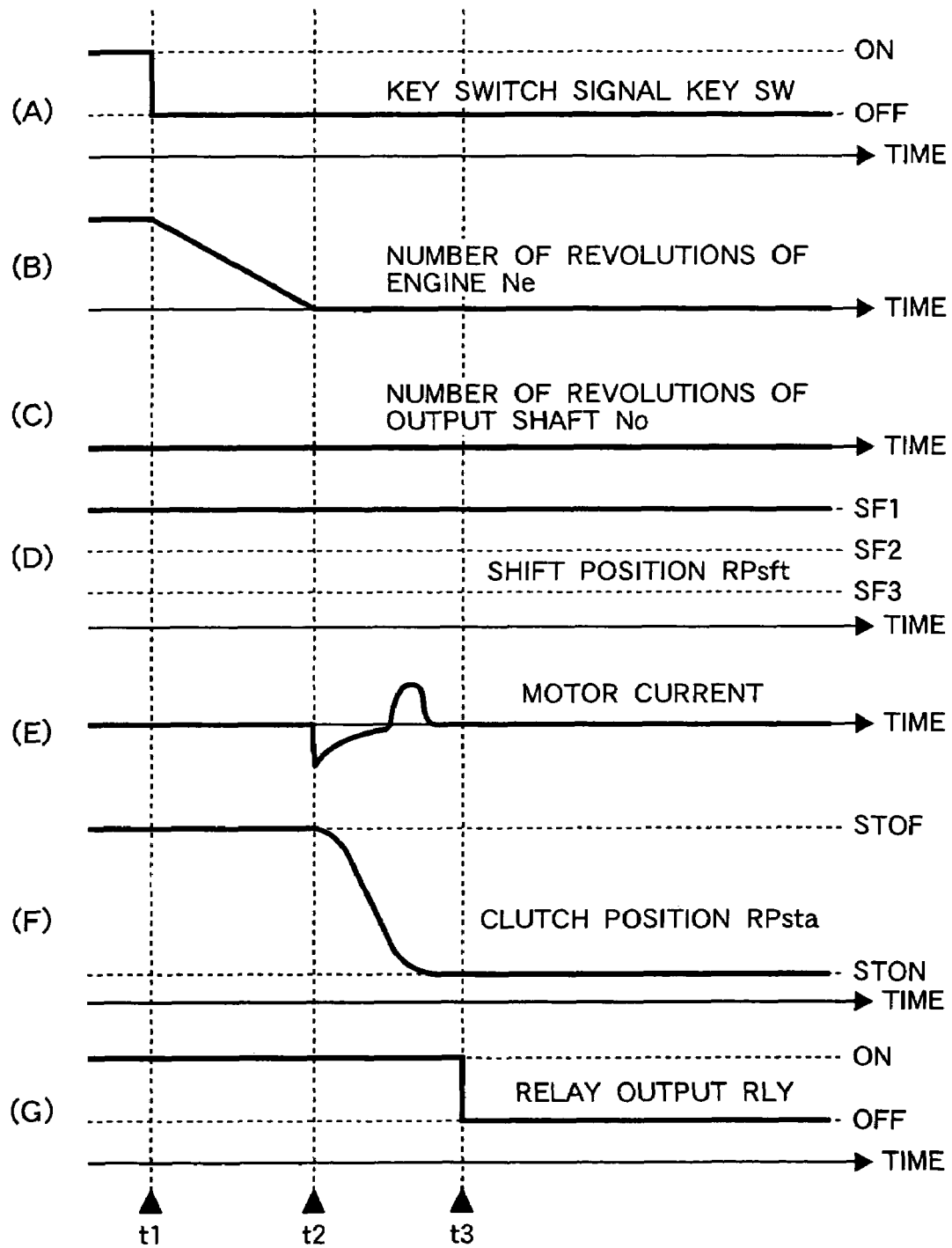
FIG. 5 shows a timing diagram of the first system-stop control example of the control apparatus of the electrically-operated mechanism in the example of FIG. 1.

Referring to FIG. 5, next will be explained a first system-stop control example using a system configuration of FIG. 4. This first system-stop control example assumes that the key switch is turned off when the shift lever is in the first-speed gear position.

FIG. 5 shows a timing diagram of the first system-stop control example of the control apparatus of the electrically-operated mechanism in the example of FIG. 1

In FIG. 5, (A) shows a timing chart of key switch signal KeySW. (B) shows a timing chart of the number of revolutions of engine Ne. (C) shows a timing chart of the number of revolutions of output shaft No. (D) shows a timing chart of shift position RPsft. Position SF1 indicates that the shift lever is in the side of first-, third-, and fifth-speed gear positions. Position SF3 indicates that the shift lever is in the side of second- and fourth-speed gear positions. Position SF2 indicates that the shift lever is in the neutral gear position. (E) shows a behavior of current of clutch motor 61b. A "minus" sign of the motor current indicates that the current flows to engage input shaft clutch 8. A "plus" sign of the motor current indicates that the current flows to disengage input shaft clutch 8. (F) indicates a transition of clutch position RPsta. When clutch position RPsta is under engagement position STON, the clutch is engaged. Pressure plate 8d is pushed by diaphragm spring 8b and consequently, clutch disc 8e is completely engaged with flywheel 8f. When clutch position RPsta is above disengagement position STOF, the clutch is disengaged and flywheel 8f is disengaged from clutch disc 8e. In other words, the transmission torque is 0 in this state. When clutch position RPsta is between engagement position STON and disengagement position STOF, the clutch is half-engaged (so called half-clutched). Here, engagement position STON and disengagement position STOF should preferably be corrected through studying since clutches are not free from machine-to-machine difference and clutch positions are greatly affected by their abrasion. (G) shows behavior of relay output RLY.

Before time t1, the vehicle is standing by at rest with the shift lever in the first-speed gear position. As shown in FIG. 5(A), key switch signal KeySW is ON and the vehicle system is active. In this state, the engine runs at a preset number of revolutions (B). The number of revolutions of the output shaft (C) is 0 (Stop) and the clutch position (F) is controlled to disengagement position STOF at Step 409 of FIG. 4. The relay output (G) is ON and power is supplied to transmission control apparatus 100.

At time t1, when key switch signal KeySW changes from ON to OFF, the control apparatus judges that the key switch is turned OFF at Step 401 of FIG. 4, that the engine is running at Step 402, and that the shift lever is not in the neutral gear position at Step 404 of FIG. 4, selects processing of Step 408 of FIG. 4, and waits with no processing. At time t1, the number of revolutions of engine Ne drops since engine control apparatus 101 shuts off fuel supply to the engine.

At time t2, when the number of revolutions of engine (B) fully drops, the control apparatus judges that the engine has stopped at Step 402 of FIG. 4, that the vehicle has stopped at Step 403 of FIG. 4, and that the clutch is not engaged at Step 405 of FIG. 4, selects processing of Step 407 of FIG. 4, controls current (E) to clutch motor 61b to engage input shaft clutch 8, and moves the clutch position from STOF (Disengagement position) to STON (Engagement position).

At time t3, when the clutch position (F) fully approaches STON (Engagement position), the control apparatus judges that the clutch is engaged at Step 405 of FIG. 4, selects processing of Step 406 of FIG. 4, turns OFF the relay output (G), and shuts off power to transmission control apparatus 100. With this, the system stops completely.

In accordance with the above structure in which, when the key switch is turned off, power to transmission control apparatus 100 is shut off after the system detects that the engine and the vehicle have stopped, engages input shaft clutch 8, and turns off the relay output, the clutch disengagement after the key switch is turned off will not be retained and promotion of deterioration of the diaphragm spring can be avoided.

Further, this structure can avoid promotion of deterioration of components of input shaft clutch actuator 61 due to continuous application of clutch load.

Figure 6:
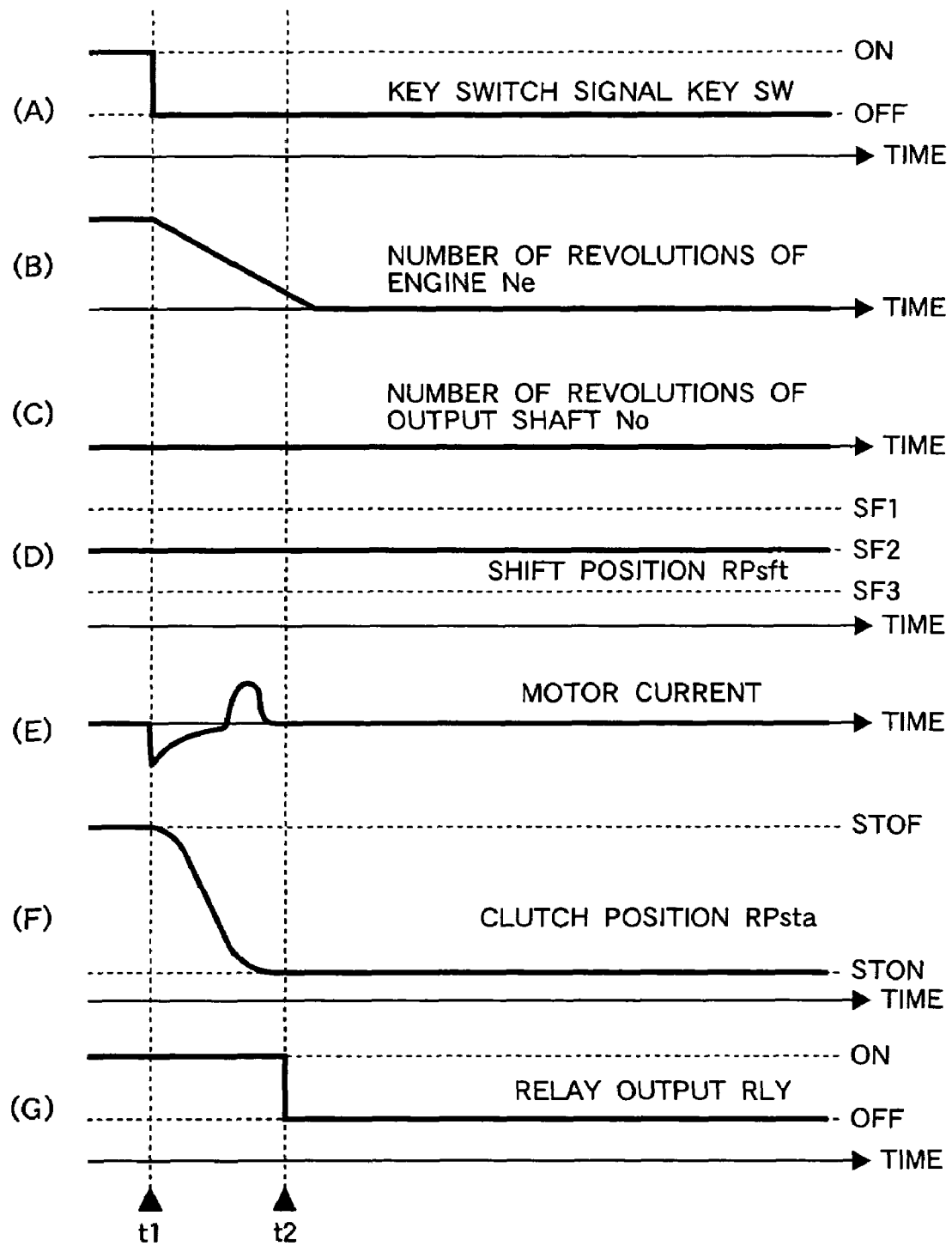
FIG. 6 shows a timing diagram of the second system-stop control example of the control apparatus of the electrically-operated mechanism in the example of FIG. 1.

Referring to FIG. 6, next will be explained a second system-stop control example using a system configuration of FIG. 4. This second system-stop control example assumes that the key switch is turned off when the shift lever is in the neutral gear position.

FIG. 6 shows a timing diagram of the second system-stop control example of the control apparatus of the electrically-operated mechanism in the example of FIG. 1.

(A) through (G) of FIG. 6 are similar to those of FIG. 5.

Before time t1, the vehicle is standing by at rest with the shift lever in the neutral gear position. As shown in FIG. 6(A), key switch signal KeySW is ON and the vehicle system is active. In this state, the engine runs at a preset number of revolutions (B). The number of revolutions of the output shaft (C) is 0 (Stop) and the clutch position (F) is controlled to disengagement position STOF at Step 409 of FIG. 4. The relay output (G) is ON and power is supplied to transmission control apparatus 100.

At time t1, when key switch signal KeySW changes from ON to OFF, the control apparatus judges that the key switch is turned OFF at Step 401 of FIG. 4, that the engine is running at Step 402, that the shift lever is in the neutral gear position at Step 404 of FIG. 4, and that the clutch is not engaged at Step 405 of FIG. 4, selects processing of Step 407 of FIG. 4, controls current (E) of clutch motor 61b to engage input shaft clutch 8, and moves the clutch position (F) from STOF (Disengagement position) to STON (Engagement position).

At time t2, when the clutch position (F) fully approaches STON (Engagement position), the control apparatus judges that the clutch is engaged at Step 405 of FIG. 4, selects processing of Step 406 of FIG. 4, turns OFF the relay output (G), and shuts off power to transmission control apparatus 100. With this, the system stops completely.

In accordance with the above structure in which, when the key switch is turned off, power to transmission control apparatus 100 is shut off after the control apparatus detects that the shift lever is in the neutral gear position, engages input shaft clutch 8, and turns OFF the relay output, the clutch disengagement after the key switch is turned off will not be retained and promotion of deterioration of the diaphragm spring can be avoided. Further, this structure can avoid promotion of deterioration of components of input shaft clutch actuator 61 due to continuous application of clutch load.

Embodiment 2

Referring to FIG. 7 to FIG. 10, next will be explained another controlling example of a vehicle control apparatus which is different from the embodiment of FIG. 4 to FIG. 6

Figure 7:
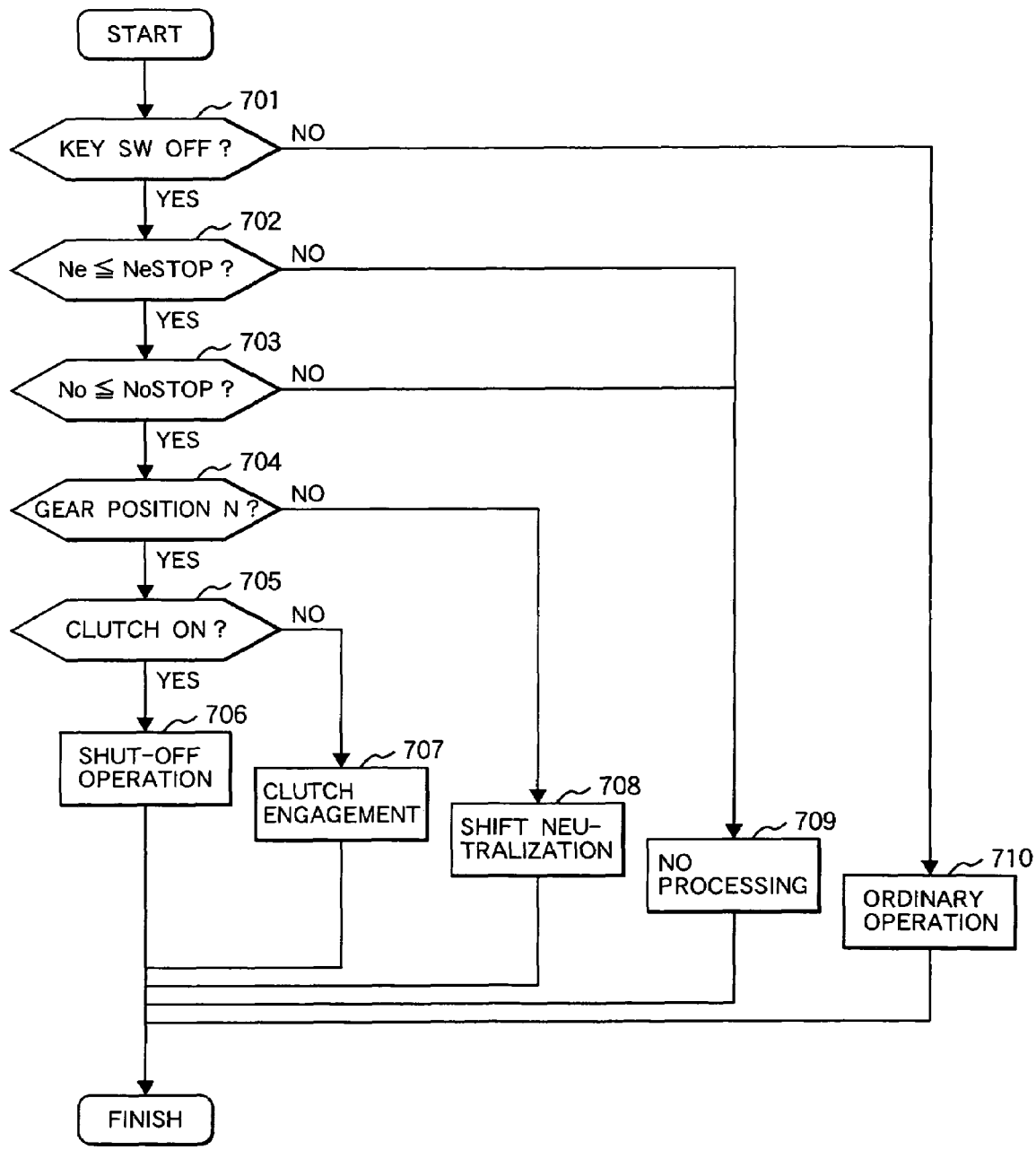
FIG. 7 shows a control flow for a system stop of the vehicle control apparatus which is another embodiment of this invention.

FIG. 7 shows a control flow for a system stop of the vehicle control apparatus which is another embodiment of this invention.

The content of FIG. 7 is programmed into the computer in transmission control apparatus 100 and repetitively executed at preset intervals. In other words, Step 701 to Step 710 below are executed by transmission control apparatus 100.

At Step 701, the control apparatus checks whether key switch signal KeySW is ON (to start) or OFF (to stop). When key switch signal KeySW is ON (to start), control is transferred to Step 710 (for ordinary operation). At Step 710, the control apparatus controls input shaft clutch actuator 61, shaft actuator 62, and select actuator 63 according to a requested operation (launching or gear-shifting) by using range position signal RngPos, acceleration pedal angle Aps, number of revolutions of engine Ne, number of revolutions of input shaft Ni, number of revolutions of output shaft No, and brake pressure Pbrk or Brake ON/OFF signal. When key switch signal KeySW is OFF (to stop), control is transferred to Step 702.

At Step 702, the control apparatus checks whether the engine is at rest or whether the number of revolutions of the engine (Ne) is equal to or less than a preset threshold value (NeStop). Control is transferred to Step 703 when Ne is equal to or smaller than NeStop or to Step 709 (No processing) when Ne is greater than NeStop. Here, NeStop (threshold value) should be equal to or smaller than the number of revolutions of the engine at full-combustion or as small as possible according to the accuracy of the detecting means so that the full engine stop may be judged similarly at Step 402 of FIG. 4. It is preferable to provide a delay time before the judgment at Step 702.

At Step 703, the control apparatus checks whether the vehicle is at rest or whether the number of revolutions of the output shaft (No) is equal to or less than a preset threshold value (NoStop). Control is transferred to Step 704 when No is equal to or smaller than NoStop or to Step 709 (No processing) when No is greater than NoStop. Similarly to Step 403 of FIG. 4, the number of revolutions of the drive shaft or the number of revolutions of wheels (vehicle speed) can be used for judgment of vehicle stop at Step 703. Further, the number-of-revolutions signal via a communication means can be used. NeStop (threshold value) should be as small as possible according to the accuracy of the detecting means so that the full vehicle stop may be judged. It is preferable to provide a delay time before the judgment at Step 703.

At Step 704, the control apparatus judges whether the shift lever is in the neutral gear position. When the shift lever is in the neutral gear position, control is transferred to Step 705. When the shift lever is not in the neutral gear position, control is transferred to Step 708. Shift actuator 62 and select actuator 63 are operated to put the mesh type mechanisms (21, 22, and 23) in the neutral position. If the clutch is engaged in this case, input shaft clutch 61 is operated to disengage input shaft clutch 8.

At Step 705, the control apparatus checks whether the clutch is engaged, or whether clutch position RPsta is engaged. When clutch position RPsta is engaged, control is transferred to Step 706. At Step 706, the control apparatus turns off relay output signal RLY to shut off power to transmission control apparatus 100. When clutch position RPsta is not engaged, control is transferred to Step 707. At Step 707, the control apparatus causes input shaft clutch actuator 61 to engage input shaft clutch 8.

In FIG. 7, at Steps 702, 703, and 704, the control apparatus respectively judges whether the engine has stopped, whether the vehicle has stopped, and whether the shift lever is in the neutral position in that order. However, the order of the steps can be changed. For example, at Steps 704, 702, and 703, the control apparatus can respectively judge whether the shift lever is in the neutral position, whether the engine has stopped, and whether the vehicle has stopped in that order.

Figure 8:
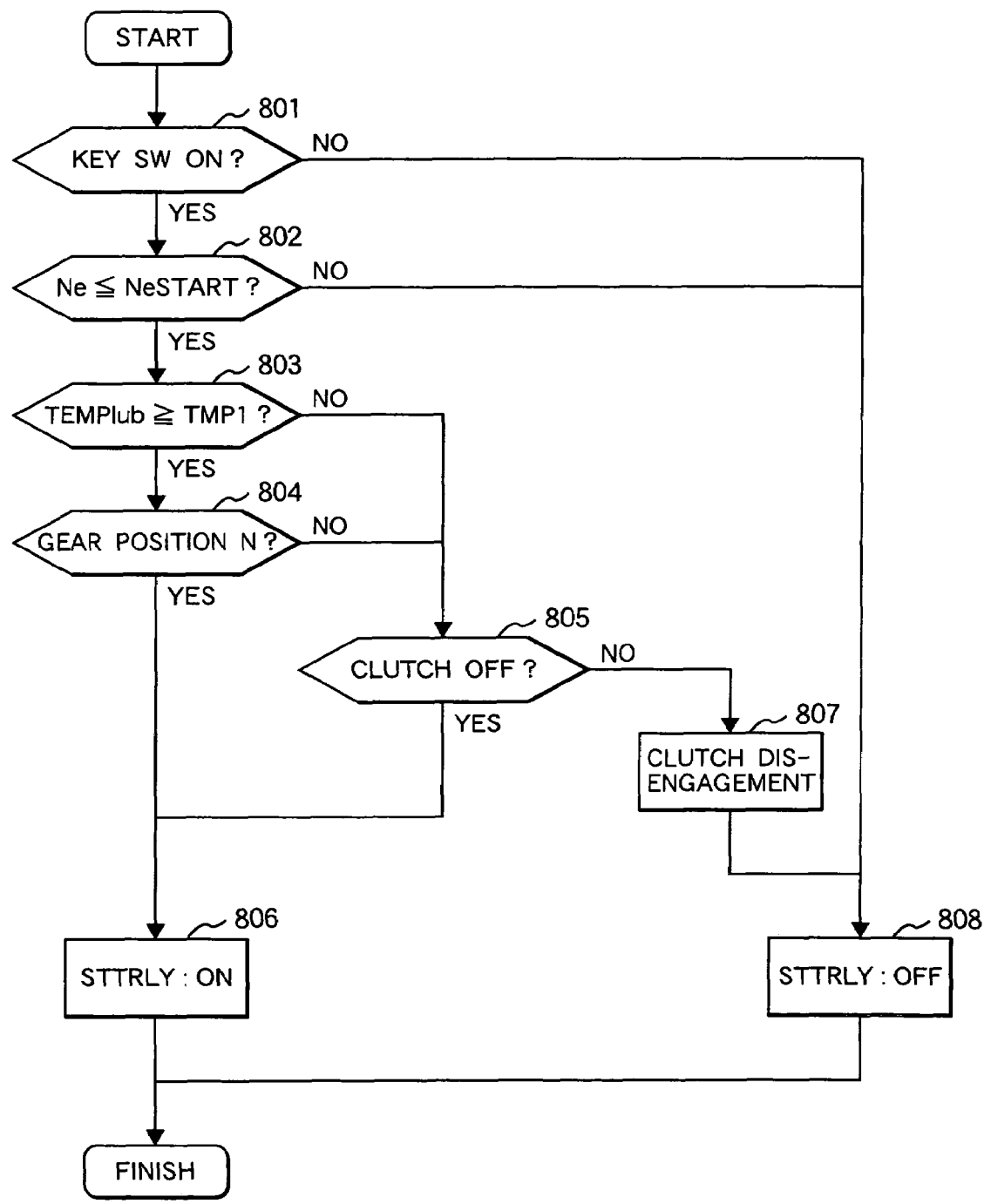
FIG. 8 shows a system start control flow of a vehicle control apparatus which is an embodiment of this invention.

Referring to FIG. 8, next will be explained a system-start control example of a vehicle control apparatus which is an embodiment of this invention.

FIG. 8 shows a system start control flow of a vehicle control apparatus which is an embodiment of this invention.

At Step 801, the control apparatus checks whether key switch signal KeySW is ON (to start) or OFF (to stop). When key switch signal KeySW is ON (to start), control is transferred to Step 802. When key switch signal KeySW is OFF (to stop), control is transferred to Step 808 and starter relay signal STTRLY is turned off (to shut off). With this, processing ends.

At Step 802, the control apparatus checks whether the engine is running or whether the number of revolutions of the engine (Ne) is equal to or less than a preset threshold value (NeStart). Control is transferred to Step 803 when Ne is equal to or smaller than NeStart or to Step 808 when Ne is greater than NeStart and starter relay signal STTRLY is turned OFF (to shut off). With this, processing ends. Here, NeStart (threshold value) should be at least equal to or greater than the number of revolutions of the engine at full-combustion or near the target number of revolutions for idling so that the engine start may be judged.

At Step 803, the control apparatus judges whether lubricant temperature TEMPlub is equal to or higher than threshold lubricant temperature TMP1. Control is transferred to Step 804 when TEMPlub is equal to or higher than TMP1 or to Step 805 when TEMPlub is lower than TMP1. Since the lubricant temperature is low, the lubricant viscosity increases and the engine startup is affected, threshold lubricant temperature TMP1 should be a temperature to disengage the clutch when the engine starts. Generally, TMP1 is a minus temperature below 0° C.

At Step 804, the control apparatus checks whether the shift gear position is neutral. When the shift gear position is neutral, control is transferred to Step 806 and starter relay signal STTRLY is turned on (to feed current). With this, processing ends. When the shift gear position is not neutral, control is transferred to Step 805.

At Step 805, the control apparatus checks whether the clutch is disengaged, or whether clutch position RPsta is disengaged. When the clutch is in the disengagement position, control is transferred to Step 806 and starter relay signal STTRLY is turned on (to feed current). With this, processing ends. When the clutch is not in the disengagement position, control is transferred to Step 807. Input shaft clutch actuator 61 is operated to disengage input shaft clutch 8. Then at Step 808, starter relay signal STTRLY is turned OFF (to shut off). With this, processing ends.

Figure 9:
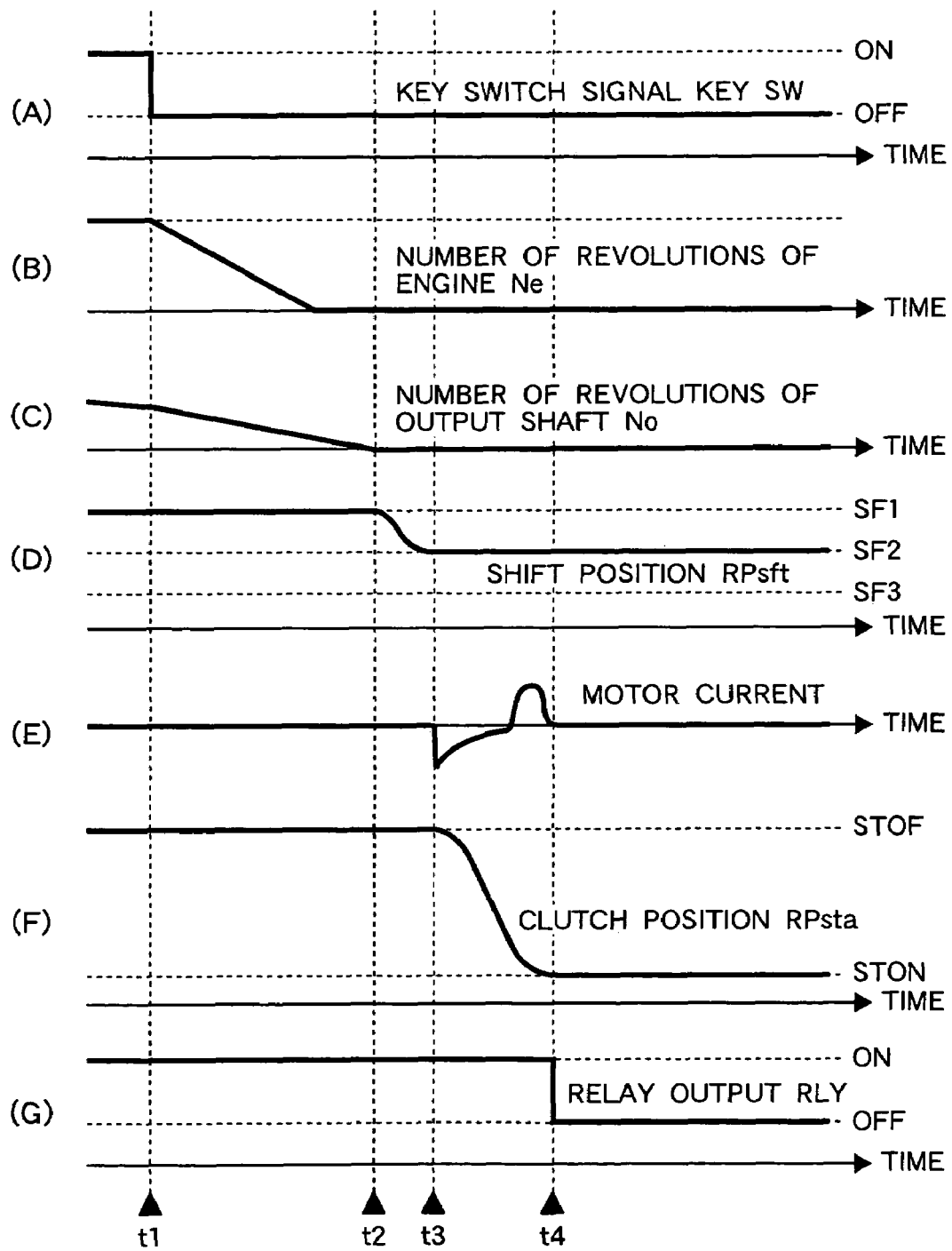
FIG. 9 shows a timing diagram of the system-stop control example of FIG. 7.

Referring to FIG. 9, next will be explained a system-stop control example using a system configuration of FIG. 7. This system-stop control example assumes that the key switch is turned off while the brake pedal is stamped for deceleration with the shift lever kept in the first-speed gear position.

FIG. 9 shows a timing diagram of the system-stop control example of FIG. 7.

(A) through (G) of FIG. 9 are similar to those of FIG. 5.

Before time t1, the brake of the vehicle is stamped for deceleration with the shift lever kept in the first-speed gear position. As shown in FIG. 9(A), key switch signal KeySW is ON and the vehicle system is active. In this state, the engine runs at a preset number of revolutions (B). The number of revolutions of the output shaft (C) is reducing. Since the brake pedal is stamped on, the clutch position (F) is controlled to disengagement position STOF at Step 710 of FIG. 7. The relay output (G) is ON and power is supplied to transmission control apparatus 100.

At time t1, when key switch signal KeySW is switched from ON to OFF, the control apparatus 100 judges that the key switch is turned OFF at Step 701 of FIG. 7 and that the engine is running at Step 702 of FIG. 7, selects processing of Step 709 of FIG. 7, and waits with no processing. At time t1, the number of revolutions of engine (Ne) drops since engine control apparatus 101 shuts off fuel supply to the engine.

At time t2, when the number of revolutions of the engine (B) and the number of revolutions of the output shaft (C) fully drop, the transmission control apparatus 100 judges that the engine has stopped at Step 702 of FIG. 7, that the vehicle has stopped at Step 703 of FIG. 7, and that the shift lever is not in the neutral gear position at Step 704 of FIG. 7, selects processing of at Step 708 of FIG. 7, and sets the gears in the neutral position. Consequently, shift actuator 62 and select actuator 63 are operated and the shift position (D) moves from SF1 (1st-speed position) to SF2 (neutral position).

If the clutch position (F) is not in STOF (Disengagement position) before time t2, input shaft clutch 8 is disengaged by processing of Step 708 of FIG. 7. Transmission control apparatus 100 controls the current (E) of clutch motor 61b until the clutch position (F) reaches STOF (Disengagement position). When the clutch position (F) gets to STOF, transmission control apparatus 100 operates shift actuator 62 and select actuator 63 to move the shift position (D) to SF2 (Neutral position).

At time t3, when the shift position (D) is closer to SF2 (Neutral position), transmission control apparatus 100 judges that the shift lever is in the neutral position and that the clutch is not in the engagement position at Step 705 of FIG. 7, selects processing of Step 707 of FIG. 7, controls the current (E) of clutch motor 61b to engage input shaft clutch 8, and moves the clutch position from STOF (Disengagement position) to STON (Engagement position).

At time t4, when the shift position (D) is closer to STON (Engagement position), transmission control apparatus 100 judges that the clutch is engaged at Step 705 of FIG. 7, selects processing of Step 706 of FIG. 7, turns off the relay output (G), and shuts off power to transmission control apparatus 100. With this the system stops completely.

In accordance with the above structure in which, when the key switch is turned off, power to transmission control apparatus 100 is shut off after the system detects that the engine and the vehicle have stopped, engages input shaft clutch 8, and turns off the relay output, the clutch disengagement after the key switch is turned off will not be retained and promotion of deterioration of the diaphragm spring can be avoided. Further, this structure can avoid promotion of deterioration of components of input shaft clutch actuator 61 due to continuous application of clutch load.

Figure 10:
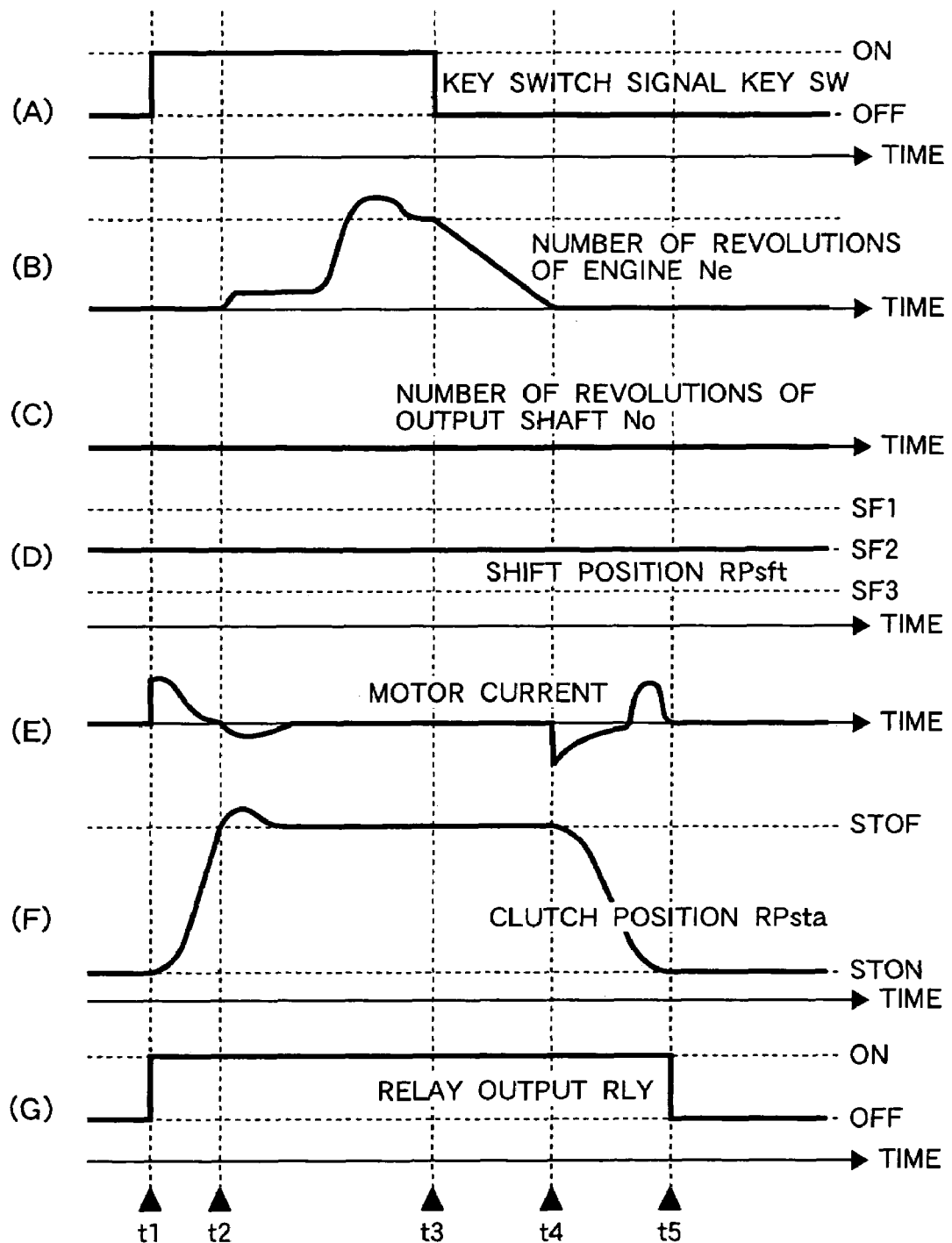
FIG. 10 shows a timing diagram of system-start and stop control examples of a control apparatus of the operating mechanism which is an example of FIG. 7 and FIG. 8.

Referring to FIG. 10, next will be explained system-start and stop control examples in the structure of FIG. 7 and FIG. 8. These examples assume that the lubricant temperature is low, that the key switch is turned ON (from OFF) with the gear position kept in the neutral status, and that the key switch is turned OFF (from ON).

FIG. 10 shows a timing diagram of system-start and stop control examples of a control apparatus of the operating mechanism which is an example of FIG. 7 and FIG. 8.

(A) through (G) of FIG. 10 are similar to those of FIG. 5.

Before time t1, the system is shut down. As shown in FIG. 10(A), key switch signal KeySW is OFF and the vehicle system is shut down. In this state, the relay output (G) is OFF and power supply to transmission control apparatus 100 is shut off.

At time t1, when key switch signal KeySW switches from OFF to ON, the relay output (G) also switches from OFF to ON and electric power is supplied to transmission control apparatus 100. Transmission control apparatus 100 judges that the key switch is ON at Step 801 of FIG. 8, that Ne (the number of revolutions of engine) is smaller than NeStart at Step 802 of FIG. 8, that TEMPlub (lubricant temperature) is smaller than TMP1 at Step 803 of FIG. 8, and that the clutch is not engaged at Step 805 of FIG. 8, selects processing of Step 807 of FIG. 8, and controls the current (E) of clutch motor 61b to disengage input shaft clutch 8. With this, the clutch position (F) moves from STON (Engagement position) to STOF (Disengagement position). At time t2, when the clutch position (F) approaches STOF (Disengagement position), transmission control apparatus 100 judges that the clutch is disengaged at Step 805 of FIG. 8, selects processing of Step 806 of FIG. 8, turns on starter relay STTRLY (to feed current), cranks the engine and increases the number of revolutions of the engine. With this, the engine can make a full combustion.

At time t3, when key switch signal KeySW switches from ON to OFF, transmission control apparatus 100 judges that the key switch is turned OFF at Step 701 of FIG. 7 and that the engine is running at Step 702 of FIG. 7, and selects processing of Step 709 of FIG. 7 (No processing). In this case, the number of revolutions of the engine (Ne) drops since engine control apparatus 101 shuts off fuel supply to the engine at time t3.

At time t4, when the number of revolutions of the engine (B) fully drops, transmission control apparatus 100 judges that the engine has stopped at Step 702 of FIG. 7, that the vehicle has stopped at Step 703 of FIG. 7, and that the clutch is not engaged at Step 705 of FIG. 7, selects processing of Step 707 of FIG. 7, controls the current (E) of clutch motor 61b to engage input shaft clutch 8, and moves the clutch position from STOF (Disengagement position) to STON (Engagement position).

At time t5, when the clutch position (F) fully approaches STON (Engagement position), transmission control apparatus 100 judges that the clutch is engaged at Step 705 of FIG. 7, selects processing of Step 706 of FIG. 7, turns off the relay output (G), and shuts off power supply to transmission control apparatus 100. With this, the system stops completely.

In accordance with the above structure in which, when the key switch is turned off, power to transmission control apparatus 100 is shut off after the control apparatus detects that the shift lever is in the neutral gear position, engages input shaft clutch 8, and turns OFF the relay output, the clutch disengagement after the key switch is turned off will not be retained and promotion of deterioration of the diaphragm spring can be avoided. Further, this structure can avoid promotion of deterioration of components of input shaft clutch actuator 61 due to continuous application of clutch load.

Although the above embodiment describes an automated MT system which automates operations of the clutch and the synchromesh mechanism, the embodiment can be applied to an automatic clutch system which automates operations of a clutch which is a friction mechanism and also to a twin-clutch system which is equipped with two clutches. Further, this embodiment can be applied to various systems which are equipped with a friction transfer mechanism which transfers power from a driving power by pushing a pushing member against a friction plane for engagement of the pushing member and the friction plane.

What is claimed is:

1. A vehicle control apparatus comprising
a friction transfer mechanism that transfers power from a driving power source by pushing a pushing member against a friction plane by an energizing mechanism, and
an electrically-operated mechanism that disengages and engages the friction transfer mechanism by controlling the position of the pushing member and is configured to keep the pushing member at the current position even when electric power is shut off; wherein,
after receiving a System Stop command signal, the vehicle control apparatus is configured to detect that the driving power source and the vehicle have stopped and that the transmission mechanism is in a neutral gear position, moves mesh type mechanisms to the neutral gear position if the mesh type mechanisms are not in the neutral gear position, engage the friction transfer mechanism, and stop the system.

2. A vehicle control apparatus comprising
a friction transfer mechanism that transfers power from a driving power source by pushing a pushing member against a friction plane by an energizing mechanism,
a gear type transmission comprising an input shaft which rotates by torque coming from the friction transfer mechanism, an output shaft which outputs torque to a drive shaft, multiple gear pairs which rotate between the input shaft and the output shaft, and multiple mesh type mechanisms which accomplish preset gear positions by coupling one of the gear pairs to the input or output shaft,
an electrically-operated mechanism which disengages and engages the friction transfer mechanism by controlling the position of the pushing member and can retain pushing member at the current position when electric power is shut off, and
a mesh type operation mechanism which controls positions or loads of the multiple mesh type mechanisms; wherein
after receiving a System Stop command signal, the vehicle control apparatus detects that the driving power source and the vehicle have stopped, moves the mesh type mechanisms to the neutral position if the mesh type mechanisms are not in the neutral position, engages the friction transfer mechanism, and stops the system.

3. A vehicle control apparatus comprising
a friction transfer mechanism that transfers power from a driving power source by pushing a pushing member against a friction plane by an energizing mechanism,
a gear type transmission comprising an input shaft which rotates by torque coming from the friction transfer mechanism, an output shaft which outputs torque to a drive shaft, multiple gear pairs which rotate between the input shaft and the output shaft, and multiple mesh type mechanisms which accomplish preset gear positions by coupling one of the gear pairs to the input or output shaft,
an electrically-operated mechanism that disengages and engages the friction transfer mechanism by controlling the position of the pushing member and keeps the pushing member at the current position even when electric power is shut off, and
a mesh type operation mechanism which controls positions or loads of the multiple mesh type mechanisms; wherein
the vehicle control apparatus further comprises
a section to acquire a System Stop command signal of the vehicle,
a section to control the electrically-operated mechanism which receives a System Stop command signal by the stop mechanism, detects that the driving power source and the vehicle have stopped, outputs a Move signal to move the mesh type mechanism to the neutral position to the mesh-type mechanism if the multiple mesh type mechanisms are not in the neutral position, and outputs an Engage signal to the electrically-operated mechanism to engage the friction transfer mechanism after detecting the mesh type mechanisms are in the neutral position, and
a System Stop signal processing section which processes to stop the system after outputting the Engage signal.

* * * * *